UNITED STATES PATENT OFFICE.

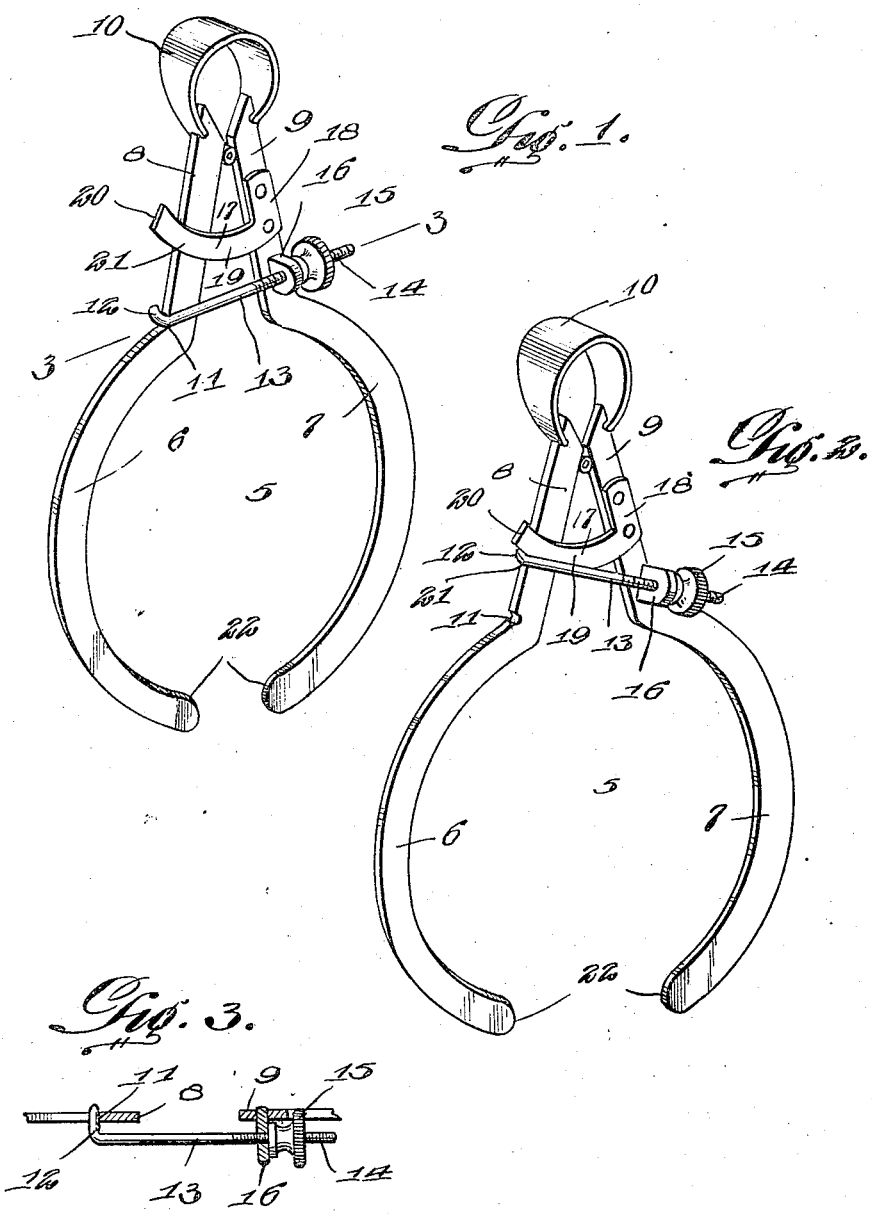

ALBERT H. LARDUSKEY, OF BALTIMORE, MARYLAND.

TIRE-TESTING DEVICE.

1,277,955.                Specification of Letters Patent.    Patented Sept. 3, 1918.

Application filed April 10, 1917. Serial No. 161,021.

*To all whom it may concern:*

Be it known that I, ALBERT H. LARDUSKEY, a citizen of the United States, residing at Baltimore, in the State of Maryland, have invented new and useful Improvements in Tire-Testing Devices, of which the following is a specification.

This invention relates generally to gages, comprehending particularly to a tire testing device capable of accurately gaging the tire to ascertain whether or not the same is properly inflated.

The chief characteristic of this invention resides in the production of a device of the above stated character, wherein through the instrumentality of a swiveled locking member, the weight to be placed upon the tire can be readily ascertained, first, by measuring the tire at a point subjected to the minimum amount of weight of the vehicle, and secondly releasing the locking member to a given point and measuring the tire at its base or the part of the tire subjected to the maximum weight of the vehicle, consequently if the distance between the jaws equals the diameter of the last mentioned measurement, this is convincing that the tire is sufficiently inflated to prevent any injury or damage being done to the latter by running on a flat tire.

To this end, the invention among other features contemplates the production of a pair of spring pressed jaws, a member carried by the arm of one jaw and co-acting with the arm of the opposite jaw for limiting the opening action of such jaws beyond a given point, and means for controlling the movement of said member upon its release from the arms for controlling the opening action of the jaws beyond a second given point.

With the above and other objects in view, the invention consists in the novel features, details of construction and combination of parts which will hereinafter be more fully set forth, illustrated in the accompanying drawing and pointed out in the appended claims.

Figure 1 is a perspective view of the device illustrating the same in locked position;

Fig. 2 is a view similar to Fig. 1 showing the device in an opened or released position; and Fig. 3 is a detail vertical section taken on line 3—3 of Fig. 1, illustrating the manner of connection of the locking member with one of the arms of the jaws.

Referring more particularly to the accompanying drawing, in which like characters of reference refer to corresponding parts in the several views, 5 denotes the tire testing device generally, which may be constructed of any suitable material, such as metal or the like, and is of such construction as to permit of its being used in ascertaining the quantity of air in the tire in an expeditious, active and simple manner.

To this end, I construct my improved testing device of a pair of jaws 6 and 7 respectively, each of substantially semi-circular form and provided on the upper ends thereof with arms 8 and 9 respectively. The members or jaws are loosely connected to one another through the employment of a spring 10 embracing the upper ends of the arms and for tensionally connecting the members together. Formed in the arm 8 of the jaw 6 at the point of formation of the former with the latter, I provide in the outer vertical edge of the jaw a notch 11 which receives the hooked end 12 of the locking member 13, when it is desired to measure the tire at its top, that is to say, at the point of the tire subjected to the minimum amount of weight of the vehicle. In carrying out this object, the locking member is in the form of a rod provided with a threaded shank 14 on which is threadedly mounted a thumb nut 15 tending to bind against the arm 9 for preventing any accidental swinging movement of the locking member 13, and consequently retaining the hooked end 12 thereof in contact with the notch 11 for effecting the foregoing results. 16 denotes an eye swiveled to the arm 9 adjacent the point of formation of the latter with the jaw 7, through which the stem 13 of the locking member projects, establishing a pivotal connection of the locking member with the arm 9. A gage 17 of substantially L-form has its vertical portion 18 secured to one of the side faces of the arm 9 at a point above and in vertical alinement with the point of connection of the eye 16 with the arm, disposing the bowed horizontal portion 19 thereof across the arm 8 of the jaw 6. The horizontal portion 17 of the gage is of such a length, to permit of the free extremity 20 thereof to extend for a distance beyond the outer longitudinal edge of the arm 8, serving to provide the same with a stop 21 adapted to obstruct the path of movement of the hook 12 for determining or controlling the proper adjustment or opening action of the confronting faces 22 of each of the jaws.

In briefly describing the operation of the invention, assuming that the jaws are set to a closed position with the hooked end 12 of the locking member seated within the notch 11 of the jaw 8, the confronting faces 22 of the jaws are placed in snug engagement with the tire over the extreme upper portion thereof; the locking member is thence released from the notch 11 and swung until the hooked end 12 contacts with the stop 21 of the gage, and if the confronting faces 22 of the jaws are permitted to clear the tire at the base portion thereof, then it is evident that the tire has been sufficiently inflated to prevent any accidental mutilation of the tire.

From the foregoing description, taken in connection with the accompanying drawing, the advantages of construction and the method of operation will be readily apparent to those skilled in the art to which the invention relates, and while I have described the principles of operation of the invention together with the device which I now consider to be the best embodiment thereof, I desire to have it understood that the device shown is merely illustrative and that such changes may be made when desired as are within the scope of the appended claims.

What is claimed as new, is:—

1. A tire testing device comprising a pair of jaws each provided with an arm, one of said arms having a notch, a member swiveled on the other of said arms, a locking member adjustably mounted in the swivel member and provided with a hooked extremity adapted to engage in the notch of the former mentioned arm upon one adjustment of the jaws, and means for limiting the swinging movement of the last mentioned means upon the release of the latter from said notch.

2. A tire testing device comprising a pair of jaws each provided with an arm, one of said arms having a notch, a member swiveled on the other of said arms, a locking member adjustably mounted in the swivel member and provided with a hooked extremity adapted to engage in the notch of the former mentioned arm upon one adjustment of the jaws, and means secured to one of said arms at a point above the swivel member and overlying the other of said arms with which the former mentioned means engages upon the release of the same from the notch of the arm.

3. A tire testing device comprising a pair of jaws each provided with an arm, one of said arms having a notch, a member swiveled on the other of said arms, a locking member threadedly mounted in the said swiveled member and provided with a hooked extremity adapted to engage in the notch of the former mentioned arm upon one adjustment of the jaws, and means for limiting the swinging movement of the last mentioned means upon the release of the latter from said notch.

In testimony whereof I affix my signature.

ALBERT H. LARDUSKEY.

Copies of this patent may be obtained for five cents each, by addressing the "Commissioner of Patents, Washington, D. C."